(12) United States Patent
Akaho

(10) Patent No.: US 8,779,727 B2
(45) Date of Patent: Jul. 15, 2014

(54) CHARGE CONTROL DEVICE AND LOAD DRIVING DEVICE

(75) Inventor: Tadashi Akaho, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 594 days.

(21) Appl. No.: 13/048,072

(22) Filed: Mar. 15, 2011

(65) Prior Publication Data

US 2011/0227542 A1  Sep. 22, 2011

(30) Foreign Application Priority Data

Mar. 18, 2010  (JP) ................................. 2010-062973

(51) Int. Cl.
*H02J 7/04* (2006.01)
*G05F 1/00* (2006.01)

(52) U.S. Cl.
USPC ........... 320/145; 320/141; 320/148; 320/162; 323/271

(58) Field of Classification Search
USPC .................................... 320/145, 162; 323/271
See application file for complete search history.

(56) References Cited

U.S. PATENT DOCUMENTS

| 2008/0012534 | A1* | 1/2008 | Bucur ............................ | 320/136 |
| 2009/0108825 | A1* | 4/2009 | Yang et al. .................... | 323/288 |

FOREIGN PATENT DOCUMENTS

JP  2000-299944  * 10/2000

OTHER PUBLICATIONS

English Translation of JP2000-299944.*

* cited by examiner

*Primary Examiner* — Drew A Dunn
*Assistant Examiner* — Nathaniel Pelton
(74) *Attorney, Agent, or Firm* — Fish & Richardson P.C.

(57) ABSTRACT

A charge control device includes a charge control circuit to control a charge of a secondary battery by controlling an output stage connected between a power supply and the secondary battery. The charge control circuit includes a first error amplifier to generate a first error voltage in response to a difference between a predetermined first reference voltage and a first feedback voltage. The value of the first feedback voltage is determined in accordance with a primary current supplied from the power supply to the output stage. The charge control circuit also includes a second error amplifier to generate a second error voltage in response to a difference between either one of a predetermined second reference voltage and the first error voltage, and a second feedback voltage. The value of the second feedback voltage is determined in accordance with a charge current supplied from the output stage to the secondary battery. The charge control circuit also includes a control signal generator to generate the control signal of the output stage in response to the second error voltage.

18 Claims, 7 Drawing Sheets

CHARGE CONTROL DEVICE AND LOAD DRIVING DEVICE

CROSS-REFERENCE TO RELATED APPLICATIONS

This application claims the benefit of priority of Japanese patent application No. 2010-062973 (filing date: 2010 Mar. 18), which is incorporated herein by reference in its entirety.

BACKGROUND

1. Field of the Invention

This disclosure relates to a charge control device or a load driving device that have a constant current control function for a charge current or a driving current.

2. Description of Related Art

FIG. 6 shows a charge control device in accordance with the related art. The charge control device includes a first feedback loop to perform a constant current control on an adaptor current Iadp supplied from an adaptor, a second feedback loop to perform a constant current control on a charge current Ichg supplied to a secondary battery BAT, and a third feedback loop to perform a constant voltage control on a charge voltage Vbat supplied to a secondary battery EAT. These feedback loops are connected in parallel. Error amplifiers ERR1 to ERR3 are provided for the respective feedback loops. Each output of the error amplifiers ERR1 to ERR3 is provided to an output control circuit CTRL via a diode OR circuit.

As an example of a technique of the related is disclosed in Japanese patent publication No. 2000-299944.

Regarding the charge control device of the related art, if a system current Isys increases suddenly during charging of a secondary battery BAT, the adaptor current Iadp is restricted to a predetermined value by a constant current control of the adaptor current Iadp, which is controlled by the first feedback loop. Thus an over supply of current from the adopter (not illustrated) can be prevented.

However, in the charge control device of the related art, if a value of an adaptor current Iadp is restricted to a predetermined value by the first feedback loop, the charge current Ichg is restricted to a value smaller than a value set by the second feedback loop. As a result, an output of the second error amplifier ERR2 becomes an over range state to drive larger charge current Ichg in the second feedback loop.

In such a condition, if the system current Isys decreases suddenly and the constant current control on the adaptor current Iadp by the first feedback loop is finished, to increase the charge current Ichg, the constant current control on the charge current Ichg by the second loop is restarted from an over range state of the second error amplifier ERR2. Thus, there is a risk of a current larger than a predetermined value flowing through the secondary battery BAT. Therefore, a circuit to resolve the problem (e.g., a soft start circuit) is being required.

FIG. 7 shows an operation of an adaptor current Iadp, a charge current Ichg, and a system current Isys in accordance with the related art. In FIG. 7, at time t3, a constant current control of the adapter current Iadp of the first feedback loop is unlocked (not locked). Then, right after constant current control of the charge current Ichg of the second feedback loop is restarted, an overshoot of the charge current Ichg occurs.

In the foregoing description, although a charge control device is illustrated, the same problem can occur in a load driving device that has a constant current control function for driving current (e.g., LED driving device or motor driving device).

SUMMARY

The disclosure describes a charge control device and a load driving device that in some implementations make it possible to perform a constant current control on a charge current and a driving current properly.

In an aspect, a charge control device includes a charge control circuit to control a charge of a secondary battery by controlling an output stage connected between a power supply and the secondary battery. The charge control circuit includes first and second error amplifiers. The first error amplifier generates a first error voltage in response to a difference between a predetermined first reference voltage and a first feedback voltage. A value of the first feedback voltage is determined in accordance with a primary current supplied from the power supply to the output stage. The second error amplifier generates a second error voltage in response to a difference between either one of a predetermined second reference voltage or the first error voltage and a second feedback voltage. A value of the second feedback voltage is determined in accordance with a charge current supplied from the output stage to the secondary battery. The charge control circuit includes a control signal generator. The control signal generator generates a control signal of the output stage in response to the second error voltage.

The details of one or more implementations of the invention are set forth in the accompanying drawings and the description below. Other features and advantages will be apparent from the description and drawings, and from the claims.

DETAILED DESCRIPTION OF PREFERRED EMBODIMENTS

Figure 1:
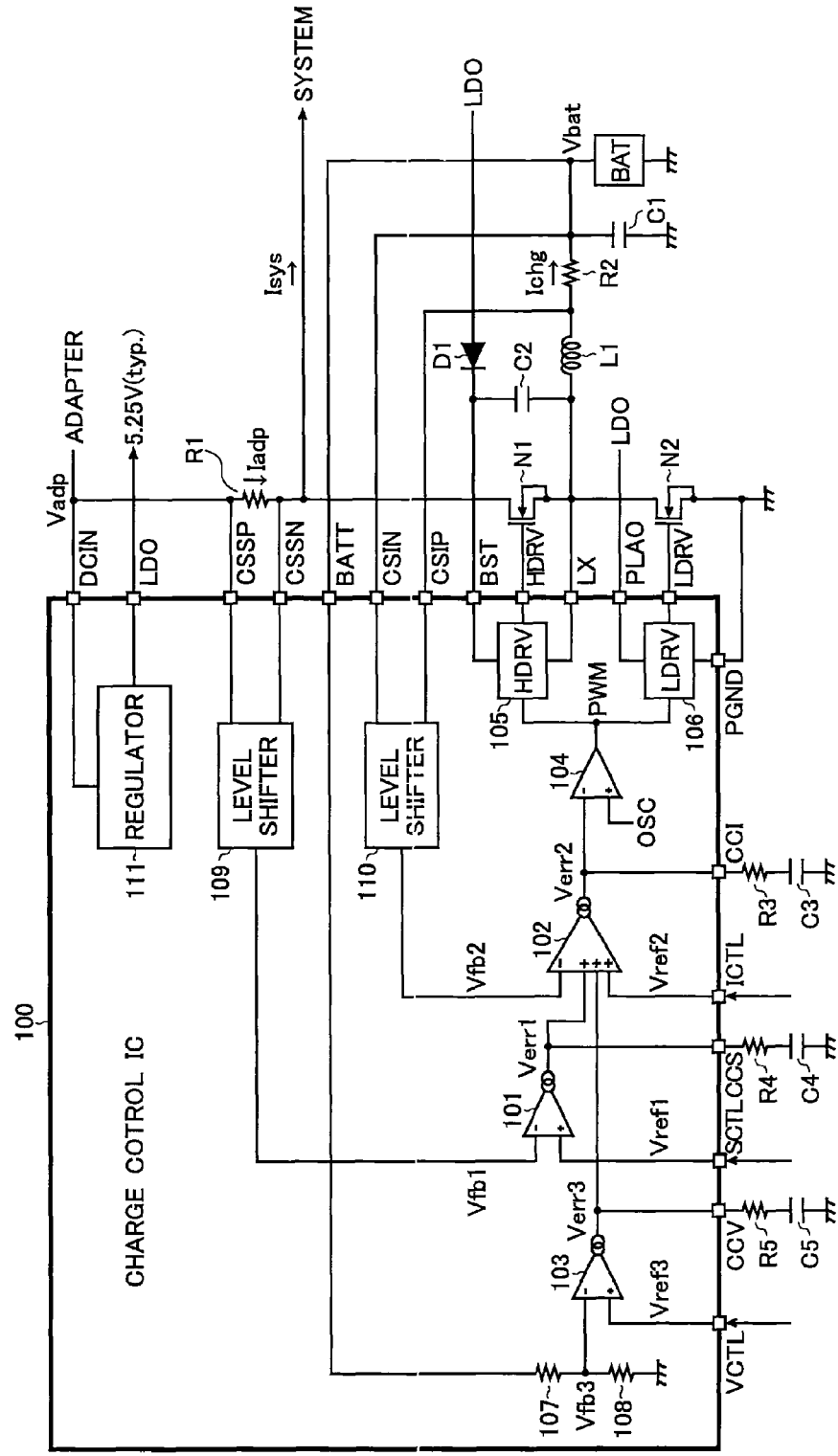
FIG. 1 illustrates an example of a charge control device in accordance with an embodiment of the invention.

As illustrated in FIG. 1, a charge control IC 100 includes a first error amplifier 101, a second amplifier 102, a third error amplifier 103, a PWM (Pulse Width Modulation) comparator 104, an upper side driver 105, a lower driver 106, resistors 107 and 108, level shifters 109 and 110, and a regulator 111. These elements can be integrated. The charge control IC 100 is equipped for an electrical apparatus (e.g., a lap top PC).

The charge control IC 100 includes a DCIN terminal (a power supply terminal), a LDO terminal (an internal power supply terminal[5.2V]), a CSSP terminal (a primary current detection terminal[+]), a CSSN terminal (a primary current detection terminal[−]), a BATT terminal (a battery voltage monitor terminal), a CSIN terminal (a charge current detection terminal[−]), a CSIP terminal (a charge current detection terminal[+]), a BST terminal (a step-up terminal to drive a high side MOSFET), a HDRV terminal (an output terminal of a high side MOSFET), a LX terminal(an inductor [coil] connection terminal), a PLAO terminal (an input terminal of a power LDO), a LDRV terminal (an output terminal of a low side MOSFET), a PGND terminal (a power GND terminal [0V]), a CCI terminal (an output terminal of a feedback error of a constant current charge), a ICTL terminal (an input terminal of a set signal of a constant current charge), a CCS terminal (an output terminal of a feedback error of a primary current), a SCTL terminal (a set terminal of a primary restriction current), a CCV terminal (an output terminal of a feedback error of a constant voltage charge), and a VCTL terminal (an input terminal of a set signal of a constant voltage charge), as terminals to connect to exterior interface.

NMOS field effect transistors (FETs) N1 and N2, a coil L1, resistors R1 to R5, capacitors C1 to C5, a diode D1, and a secondary battery BAT are connected to the charge control IC 100 externally.

A drain terminal of the transistor N1 is connected to the CSSN terminal. A source terminal and a back gate of the transistor N1 are connected to the LX terminal. A gate terminal of the transistor N1 is connected to the HDRV terminal. A drain terminal of the transistor N2 is connected to the LX terminal. A source terminal and a back gate of the transistor N2 are connected to the PGND terminal. A gate terminal of the transistor N2 is connected to the LDRV terminal. A first end of the coil L1 is connected to the LX terminal. A second terminal of the coil L1 is connected to the CSIP terminal. A first end of the resistor R1 is connected to the DCIN terminal and the CSSP terminal. A second end of the resistor R1 is connected to the CSSN terminal. A first end of the resistor R2 is connected to the CSIP terminal. A second end of the second resistor is connected to the CSIN terminal. A first terminal of the capacitor C1 is connected to the CSIN terminal. A second terminal of the capacitor C1 is connected to a ground terminal. A first end of the capacitor C2 is connected to the BST terminal. A second end of the capacitor C2 is connected to the LX terminal. A cathode terminal of the diode D1 is connected to the BST terminal. An anode terminal of the diode D1 is connected to the LDO terminal. A positive terminal of the secondary battery BAT is connected to the CSIN terminal and the BATT terminal. A negative terminal of the secondary battery BAT is connected to the ground terminal. The DCIN terminal is connected to an adapter (a power source). The LDO terminal is connected to the PLAO terminal. The system current Isys consumed at a system itself provided with the charge control IC 100 is supplied from the CSSN terminal (a second end of the resistor R1).

Between the adaptor and the secondary battery BAT are provided the transistors N1 and N2, the coin L1, the capacitors C1 and C2, and the diode D1. Thus, a step-down output stage is formed by converting the adaptor voltage Vadp to the charge voltage Vbat of the secondary battery BAT. The capacitor C2 and the diode D1 can be discrete elements that form a bootstrap circuit. The bootstrap circuit generates a high voltage to turn ON the NMOS FET N1. If a PMOS FET is used instead of the NMOS FET N1, the capacitor C2 and the diode D1 need not be included.

The resistor R1 is a sense resistor to detect tie adaptor current Iadp (a primary current) supplied from the adaptor to the output stage. The resistor R2 is a sense resistor to detect the charge current Ichg supplied from the output stage to the secondary battery BAT. Current detection is not limited to the illustrated configuration. For example, apart from a current path from the adaptor to the secondary battery BAT, an extra current path can be provided to detect a current.

The resistor R3 and the capacitor C3 are connected directly between the CCI terminal and the ground terminal and form a phase compensation circuit of the second error amplifier 102. The resistor R4 and the capacitor C5 are connected directly between the CCS terminal and the ground terminal and form a phase compensation circuit of the first error amplifier 101. The resistor R5 and the capacitor C5 are connected directly between the CCV terminal and the ground terminal and form a phase compensation circuit of the third error amplifier 103.

Circuit elements provided in the charge control IC 100 are described below.

The first error amplifier 101 provides a current based on the difference between a predetermined first reference voltage Vref1 and a first feedback voltage Vfb1, where the value of Vfb1 is determined in accordance with the adaptor current Iadp. The first error amplifier 101 is a gm amplifier (a transconductor amplifier) that generates a first error voltage Verr1 to the CCS terminal. A non inverting terminal (+) of the first error amplifier 101 is connected to a voltage input terminal (the SCTL terminal) of the first reference voltage Vref1. An inverting terminal (−) of the first error amplifier 101 is connected to a voltage input terminal (an output terminal of the level shifter 109) of the first feedback voltage Vfb1. An output terminal of the first error amplifier 101 is connected to the CCS terminal. The first reference voltage Vref1 is a reference voltage to set an upper value of the adaptor current Iadp. The higher the first feedback voltage Vfb1 and the closer it is to the first reference voltage Vref1, the lower the first error voltage Verr1 becomes. Thus, the first error amplifier 101 is one of the circuit elements that forms a first feedback loop to perform a constant current control on the adaptor current Iadp.

The error amplifier 102 is a gm amplifier to select any one of a predetermined second reference voltage Vref2 and the first error voltage Verr1 and a third error voltage Verr3 (described later). The error amplifier 102 outputs a current based on the difference between the selected voltage (the lowest voltage) and the second feedback voltage Vfb2. Thus, the error amplifier 102 generates the second error voltage Verr2 to the CCI terminal. A first non inverting terminal (+) of the second error amplifier 102 is connected to a voltage input terminal (the ICTL terminal) of the second reference voltage Vref2. A second non inverting terminal (+) of the second error amplifier 102 is connected to a voltage input terminal (the CCS terminal) of the first error voltage Verr1. A third non inverting terminal (+) of the second error amplifier 102 is connected to a voltage input terminal (the CCV terminal) of the third error voltage Veer3. An inverting terminal (−) of the second error amplifier 102 is connected to a voltage input terminal (an output terminal of the level shifter 110) of the second feedback voltage Vfb2. An output terminal of the second error amplifier is connected to the CCI terminal. The second reference voltage Vref2 is a reference voltage to set an upper value (a desired value) of the charge current Ichg. The higher the second feedback voltage Vfb2 and the closer it is to the second reference voltage Vref2, the lower the second error voltage Verr2 becomes. Thus, the second error amplifier 102 is one of the circuit elements that forms a second feedback loop to perform a constant current control on the charge current Ichg. If the first error voltage Verr1 or the third error voltage Verr3 is lower than the second reference voltage Vref2, the second error voltage Verr2 is generated based on the difference between the lowest voltage of either one of the two voltages Verr1 and Verr3, and the second feedback voltage Vfb2. Thus, the second error amplifier 102 is one of the circuit elements that forms the second feedback loop. The second error amplifier 102 is also one of the circuit elements of the first feedback loop and a third, feedback loop (described below).

The third error amplifier 103 is a gm amplifier that outputs a current based on the difference between a predetermined third reference voltage Vref3 and a third feedback voltage Vfb3, where the value of the third feedback voltage Vfb3 is determined in accordance with the charge voltage Vbat. Thus, the third error amplifier 103 generates the third error voltage Verr3 to the CCV terminal. A non inverting terminal (+) of the third error amplifier 103 is connected to an input terminal (the VCTL terminal) of the third reference voltage Vref3. An inverting terminal (−) of the third error amplifier 103 is connected to an input terminal (a connection node between the resistor 107 and the resistor 108) of the third feedback voltage Vfb3. An output terminal of the third error amplifier 103 is connected to the CCV terminal. The third reference voltage Vref3 is a reference voltage to set an upper value of the charge voltage Vbat. The higher the third feedback voltage Vfb3 and the closer it is to the third reference voltage Vref3, the lower the third error voltage Verr3 becomes. Thus, the third error amplifier 103 is one of the circuit elements that forms the third feedback loop to perform a constant voltage control on the charge voltage Vbat.

With respect to the first error amplifier 101, the second error amplifier 102 and the third error amplifier 103, a voltage output amplifier can be used instead of a gm amplifier to output a current.

The PWM comparator 104 generates a pulse width modulation signal PWM based on a comparison between the second error voltage Verr2 and a triangle wave voltage OSC of a predetermined frequency. An inverting terminal (−) of the PWM comparator 104 is connected to a voltage input terminal (an output terminal of the second error amplifier 102) of the second error voltage Verr2. A non inverting terminal (+) of the PWM comparator 104 is connected to a voltage input terminal (+) of the triangle wave voltage OSC. The pulse width modulation signal PWM becomes a high level if the second error voltage Verr2 is lower than the triangle wave voltage OSC, and becomes a low level if the second error voltage Verr2 is higher than the triangle wave voltage OSC. Thus, regarding the pulse width (a high level period) of the pulse width modulation signal PWM, the lower the second error voltage Verr2, the longer the pulse width becomes, and the higher the second error voltage Verr2, the shorter the pulse width becomes. An output terminal of the PWM comparator 104 is connected to the upper side driver 105 and the lower side driver 106.

The upper side driver 105 generates a gate signal of the transistor N1 based on the pulse width modulation signal PWM. If the pulse width modulation signal PWM is a high level, the upper side driver 105 provides a low level signal to a gate of the transistor N1 and turns OFF the transistor N1. If the pulse width modulation signal PWM is a low level, the upper side driver 105 provides a high level signal to a gate of the transistor N1 and turns ON the transistor N1.

The lower side driver 106 generates a gate signal of the transistor N2 based on the pulse width modulation signal PWM. If the pulse width modulation signal PWM is a high level, the lower side driver 106 provides a high level signal to a gate of the transistor N2 and turns ON the transistor N2. If the pulse width modulation signal PWM is a low level, the lower side driver 106 provides a low level signal to a gate of the transistor N2 and turns OFF the transistor N2.

The upper driver 105 and the lower driver 106 are operated such that they do not turn ON the transistors N1 and N2 simultaneously. If the pulse modulation signal rises from a low level to a high level, the transistor N2 is turned ON after the transistor N1 is turned OFF. If the pulse modulation signal falls from a high level to a low level, the transistor N1 is turned ON after the transistor N2 is turned OFF.

The PWM comparator 104 and the upper side driver 105 and the lower side driver 106 is a control signal generator to generate a control signal (i.e., gate signals of the transistors N1 and N2) of the output stage based on the second error voltage Verr2.

The resistors 107 and 108 are connected between the BATT terminal and the ground terminal, and generate the third feedback voltage Vfb3 by dividing the charge voltage Vbat by a predetermined ratio (e.g., ⅟₁₀).

The level shifter 109 generates the feedback voltage Vfb1 by multiplying (e.g., ten times) a voltage generated by the resistor R1 (i.e., a voltage between the CSSP terminal and the CSSN terminal).

The level shifter 110 generates the second feedback voltage Vfb2 by multiplying (e.g., ten times) a voltage generated by the resistor R2 (i.e., a voltage between the CSIP terminal and the CSIN terminal).

The regulator 111 generates a predetermined internal power supply voltage (e.g., 5.25V) by stepping down an adaptor voltage Vadp provided to the DCIN terminal, and provides the internal power supply voltage to the LDO terminal.

The charge controller IC 100 controls the charge of the secondary battery BAT by controlling an output stage connected between the adaptor and the secondary battery BAT. The operation of the charge control IC 100 is described below.

An operation when the adaptor current Iadp is restricted to a predetermined upper value by the first feedback loop is described below. When the first feedback loop is activated, a condition can be assumed. The condition is a state when the system current Isys increases suddenly during charging of the secondary battery BAT and the adaptor current Iadp approaches a predetermined upper value, and the first error voltage Verr1 becomes the lowest voltage of the three voltages among the second reference voltage Vref2, the first error voltage Verr1 and the third error voltage Verr3.

In such a condition, at the second error amplifier 102, the second error voltage Verr2 is generated based on the difference between the first error voltage Verr1 and the second feedback voltage Vfb2. Thus, the charge current Ichg is restricted to be smaller than an upper value determined in accordance with the second reference voltage Vref2. The adaptor current Iadp is restricted by a predetermined upper value determined in accordance with the first reference voltage Vref1.

For example, if the first reference voltage Vref1 is set at 375 mV and the first feedback voltage Vfb1 is set at ten times as large value as a voltage across the resistor R1, a constant current control of the adaptor current Iadp is operated to equalizes the voltage across the resistor R1 with 37.5 mV by the first feedback loop. If a resistance of the resistor R1 is 15 mOhm, an upper value of the adaptor current Iadp becomes 2.5 A (i.e., 37.5 mV/15 mOhm).

Thus, the adaptor current Iadp is limited to a predetermined value by the first feedback loop. An over supply of a current from the adaptor can be prevented if the system current Isys increases suddenly during charging of the secondary battery BAT.

An operation when the battery voltage Vbat is limited to a predetermined upper value by the third feedback loop is described below. When the third feedback loop is activated, a condition can be assumed. The condition is a state when the charge of the secondary battery BAT is progressed and the charged voltage Vbat approaches a predetermined upper value, and the third error voltage Verr3 becomes the lowest voltage among the three voltages of the second reference voltage Vref2, the first error voltage Verr1 and the third error voltage Verr3.

In such a condition, at the second error amplifier 102, the second error voltage Verr2 is generated based on the difference between the third error voltage Verr3 and the second feedback voltage Vfb2. Thus, the charge current Ichg is restricted to be smaller than an upper value determined in accordance with the second reference voltage Vref2. The charge voltage Vbat is restricted to a predetermined upper value determined in accordance with the third reference voltage Vref3.

For example, if the third reference voltage Vref3 is set at 0.84V and the third feedback voltage Vfb3 is set at one tenth of the charge voltage Vbat, a constant voltage control of the charge voltage Vbat is operated to cause the charge voltage Vbat to be equal to the 8.4V by the third feedback loop. It is desirable to make the third reference value Vref3 adjustable in accordance with the number of cells used for the secondary battery BAT. If a lithium ion battery is used as the secondary battery BAT (a fully charged voltage of the cell is, e.g., 4.2V), in accordance with the number of cells used for the secondary battery BAT, one of the four voltages of 0.42V, 0.84V, 1.26V or 1.68V is set as the third reference voltage Vref3. Thus, the technique can be applied to an increasing/decreasing number of cells.

The charge voltage Vbat is restricted to a predetermined upper value by the third feedback loop. Thus, an overcharge of the secondary battery BAT can be prevented.

An operation when the charge current Ichg is restricted to a predetermined value by the second feedback loop is described below. When the second feedback loop is activated, a condition can be supposed. The condition is a state when the adapter current Iadp is smaller than a predetermined upper value and the secondary battery BAT is not fully charged, and the second reference voltage Vref2 becomes the lowest voltage among the three voltages of the second reference voltage Vref2, the first error voltage Verr1 and the third error voltage Verr3.

In such a condition, at the second error amplifier 102, the second error voltage Verr2 is generated based on the difference between the second reference voltage Vref2 and the second feedback voltage Vfb2. Thus, the charge current Ichg is controlled to be the original upper limit value (target value) determined in accordance with the second reference voltage Vref2.

For example, if the second reference voltage Vref2 is set at 375 mV and the second feedback voltage Vfb2 is set at ten times as large as a voltage across the resistor R2, a constant current control of the charge current Ichg is operated to cause the voltage across the resistor R2 to be equal to the 37.5 mV by the second feedback loop. If a resistance of the resistor R2 is 15 mOhm, an upper value of the charge current Ichg becomes 2.5 A (i.e., 37.5 mV/15 mOhm).

Thus, the charge current Ichg is restricted to a predetermined upper value by the second feedback loop. An over supply of a current to the secondary battery BAT can be prevented, and the secondary battery BAT can be charged safely.

As described above, the second feedback loop to perform a constant current control on the charge current Ichg is provided as a basis of an operation. If the adaptor current Iadp or the charge voltage Vbat approaches a predetermined upper value, to decrease the charge current Ichg to be less than a predetermined upper value, the first feedback loop to perform a constant current control on the adaptor current Iadp and the third feedback loop to perform a constant voltage control on the charge voltage Vbat are provided.

The foregoing arrangement has a first feedback loop, a second feedback loop and a third feedback loop in parallel. If the adaptor current Iadp is restricted to a predetermined upper value by the first feedback loop, the output of the second error amplifier 102 of the second feedback loop does not result in an over range state. Thus if a constant current control of the adaptor current Iadp by the first feedback loop is unlocked (not locked), and constant current control of the charge current Ichg by the second feedback loop is restarted, an over supply of the charge current Ichg can be prevented from flowing to the secondary battery BAT (i.e., an over shoot of a current can be prevented). As a result, a soft start circuit is riot required to charge the secondary batter BAT safely.

The second feedback loop to perform a constant current control on the charge current Ichg is provided as a basis of an operation. Thus, for both a constant current mode when the second feedback loop is activated and the constant voltage mode when the third feedback loop is activated, a phase delay caused by a LC filter (a secondary LPF [Low Pass Filter]) of an output stage can be canceled. A stable feedback loop can thereby be achieved. Thus, with respect to the charge control IC 100 in accordance with the embodiment, phase compensation is realized easily compared to a composition with the third feedback loop (the third feedback loop performs a constant voltage control for the charge voltage Vbat) is provided as a basis of an operation.

To realize a smooth change among feedback loops, multiple gm amplifiers can be used. However, this construction leads to an increase of circuit area and equalizing values of gm amplifiers is required. However, as for the charge control IC 100 of described above, such a problem does not exist. Thus, an increase of a circuit area can be avoided with a simple construction, and a smooth change among feedback loops can be realized.

Figure 2:
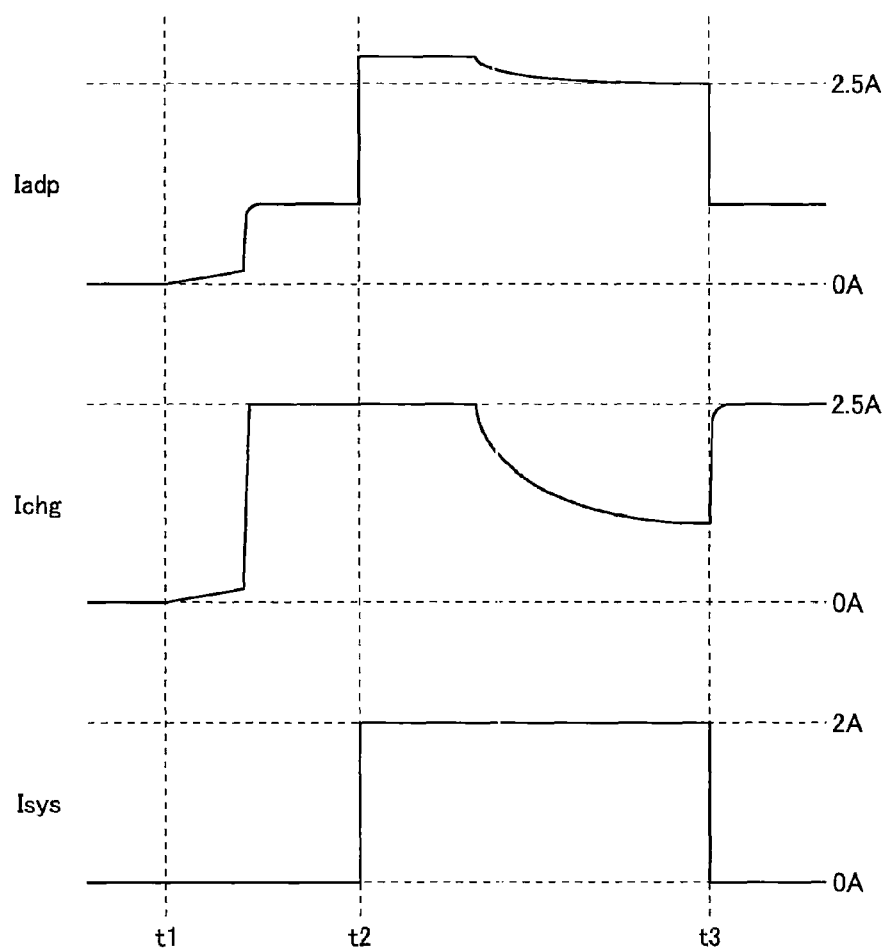
FIG. 2 illustrates an adaptor current Iadp, a charge current Ichg, and a system current Isys.

FIG. 2 is a waveform diagram illustrating an adaptor current Iadp, a charge current Ichg, and a system current Isys of the charge control IC 100 in accordance with the embodiment.

At time t1 in FIG. 2, charging of the secondary battery BAT is started. During the time t1 to t2, constant current control of the charge current Ichg by the second feedback loop is performed. At time t2, the system current Isys increases suddenly. During the time t2 to t3, constant current control of the adaptor current Iadp by the first feedback loop is performed. At time t3, the system current Isys decreases suddenly, and constant current control of the adaptor current Iadp by the first feedback loop is terminated. After time t3, constant current control of the charge current Ichg by the second feedback loop is restarted.

Figure 7:
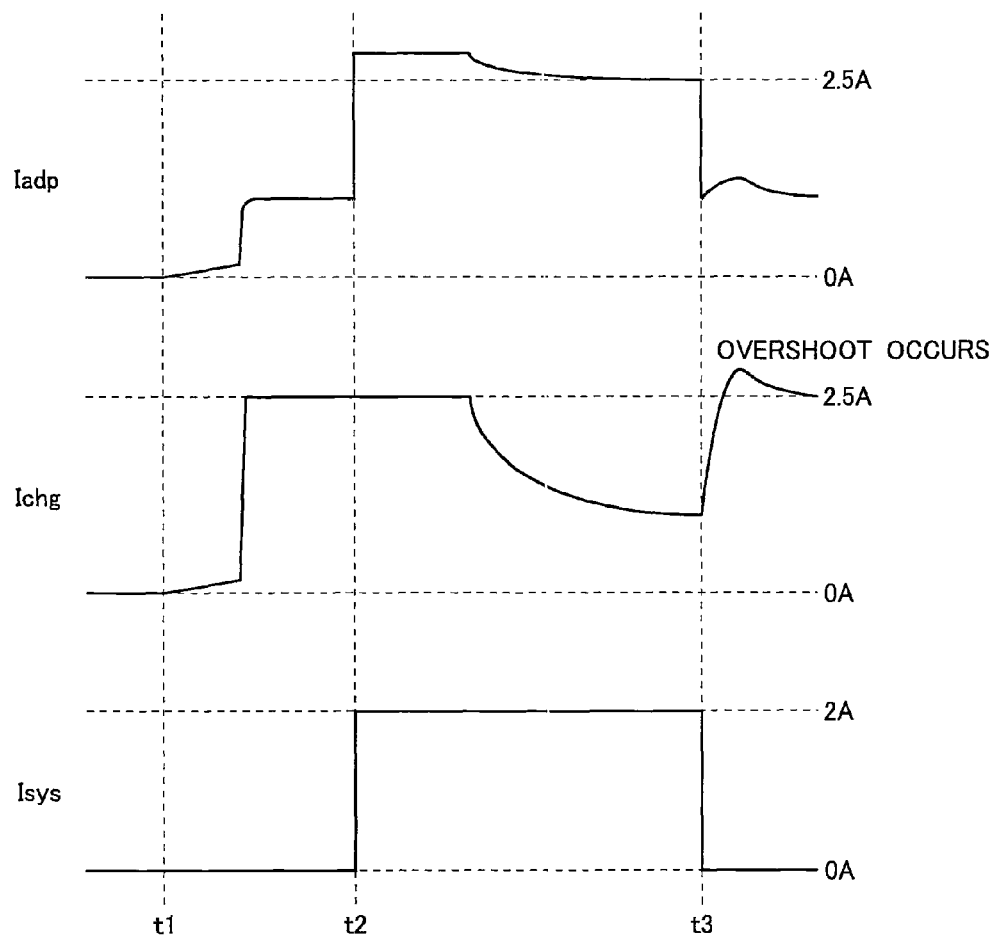
FIG. 7 illustrates an adaptor current Iadp, a charge current Ichg, and a system current Isys in accordance with the related art.

As shown in FIG. 2 and FIG. 7, as for the charge control IC 100 described above, when the first feedback loop operation is changed to the second feedback loop operation at time t3, an over supply of a charge current Ichg flowing to the secondary battery BAT can be prevented.

A technique to generate a second reference voltage Vref2 is described below in reference to FIGS. 3A and 3B.

Figure 3A:
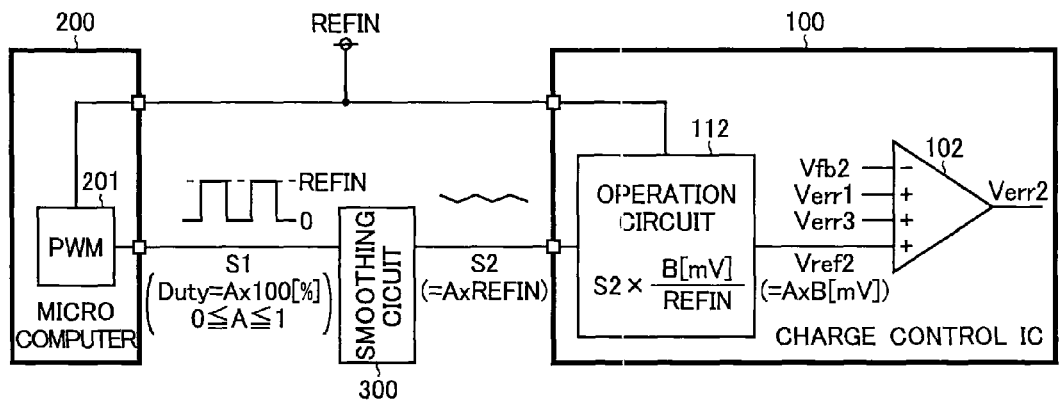
FIG. 3A illustrates a first technique to generate a second reference voltage Vref2.

As an example, FIG. 3A illustrates a system hat provides a PWM signal S1 as a control signal to control the second reference voltage Vref2, and that provides the PWM signal S1 from a signal generator 201 of a micro computer 200.

The PWM signal generator 201 operates in response to an input of an external reference voltage REFIN, and outputs PWM signal S1 of duty A [×100%] (A is greater than or equal to 0, and smaller than or equal to 1). A high level of the PWM signal S1 is the reference voltage REFIN [mV] and a low level is 0V.

The smoothing circuit 300 smoothes the PWM signal S1 and generates an analog voltage S2. A voltage of the analog voltage S2 is calculated as A multiplied by REFIN (A*REFIN [mV]). Thus, the analog voltage S2 fluctuates in response to an affection of the external reference voltage REFIN.

An operation circuit 112 to generate the second reference voltage Vref2 from an externally provided analog voltage S2 is formed within the charge control IC 100. The operation circuit 112 divides the analog voltage S2 by the external reference voltage REFIN[mV] and multiplies the predetermined internal reference voltage B[mV], thereby generating the second voltage Vref2. Thus, a voltage of the second reference voltage Vref2 is calculated by the duty A multiplied by the internal reference voltage B (A*B[mV]). Therefore, the second reference voltage Vref2 is determined in accordance with the duty A of the PWM signal S1 and the internal reference voltage B without any influence of the external reference voltage REFIN[mV].

Figure 3B:
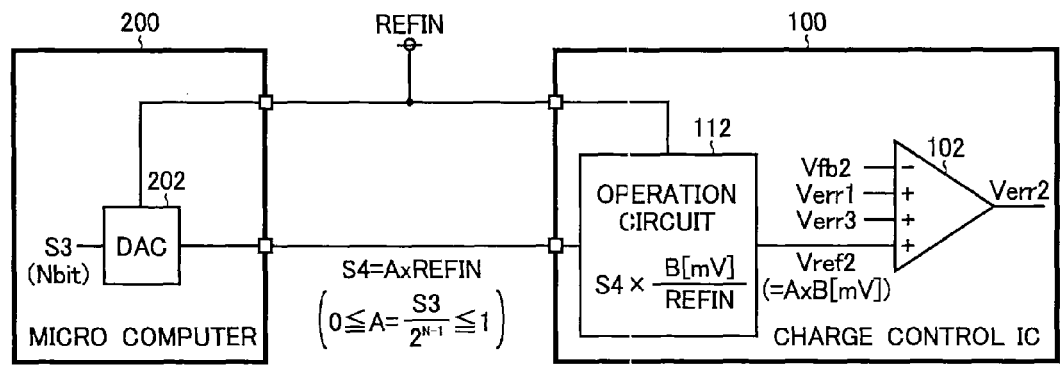
FIG. 3B illustrates a second technique to generate a second reference voltage Vref2.

As an example, FIG. 3B illustrates a system that provides an analog voltage S4 as a control signal of the second reference voltage Vref2, and that provides the analog voltage S4 from a D/A converter 202 of the micro computer 200. The D/A converter 202 can be integrated within the charge control IC 100.

A DAC (a digital-to-analog converter) 202 operates in response to an input of the external reference voltage REFIN, converts a digital signal S3 (S3 is larger than or equal to 0, and is smaller than or equal to $2^{n-1}$) of n-bit (n is a natural number) to the analog voltage S4, and outputs the analog voltage S4. A voltage of the analog voltage S4 is calculated as A multiplied by REFIN (A=S3/$2^{n-1}$ is larger than or equal to 0, and smaller than or equal to 1). Thus, the analog voltage S4 fluctuates in accordance with an affection of the external reference voltage REFIN.

An operation circuit 112 to generate the second reference voltage Vref2 from an analog voltage S4 provided from outside is formed within the charge control IC 100. The operation circuit 112 divides the analog voltage S4 by the external reference voltage REFIN and multiplies the predetermined internal reference voltage B, thereby generating the second voltage Vref2. Thus, a voltage of the second reference voltage Vref2 is calculated by the duty A multiplied by the internal reference voltage B. Therefore, the second reference voltage Vref2 is determined in accordance with the coefficient A and the internal reference voltage B without any influence of the external reference voltage REFIN. The coefficient A (A=S3/$2^{n-1}$) is determined in response to the digital signal S3.

An example of a technique to generate the second reference voltage Vref2 is described above. Also, both the first reference voltage Vref1 and the third reference voltage Vref3 can be generated using the same technique.

Figure 4A:
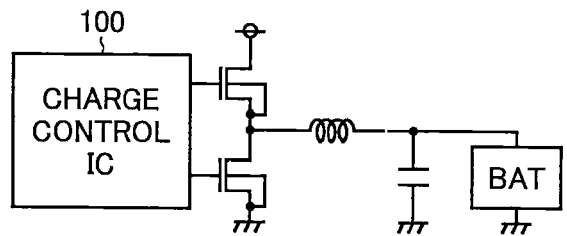
FIG. 4A illustrates a step-down circuit as an output stage.
Figure 4B:
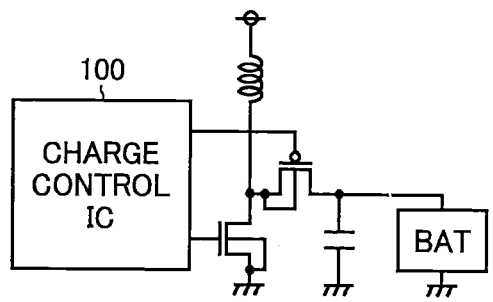
FIG. 4B illustrates a step-up circuit as an output stage.
Figure 4C:
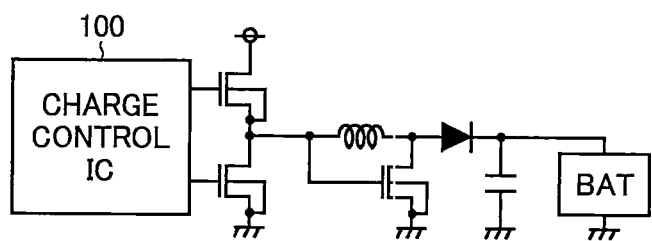
FIG. 4C illustrates a step-up and step-down circuit as an output stage.

Although an example of the charge control IC 100 using a step-down circuit is described above, the disclosure is not limited to the illustrated construction. Apart from an example using a step-down circuit as an output stage, circuits of a step-up (illustrated in FIG. 4B) or a step-up and step-down circuit (illustrated in FIG. 4C) can be used.

Figure 5A:
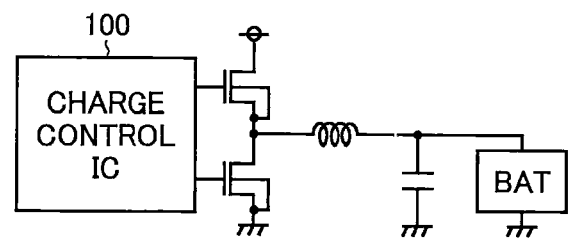
FIG. 5A illustrates a charge control device.
Figure 5B:
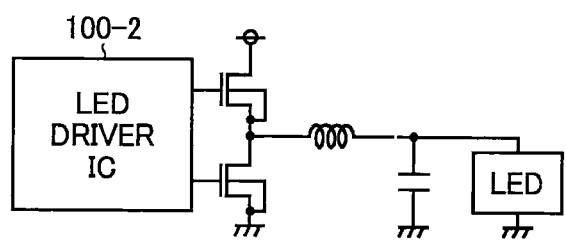
FIG. 5B illustrates a LED driving device.
Figure 5C:
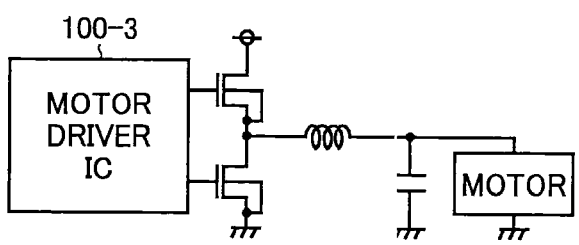
FIG. 5C illustrates a motor drive device.
Figure 6:
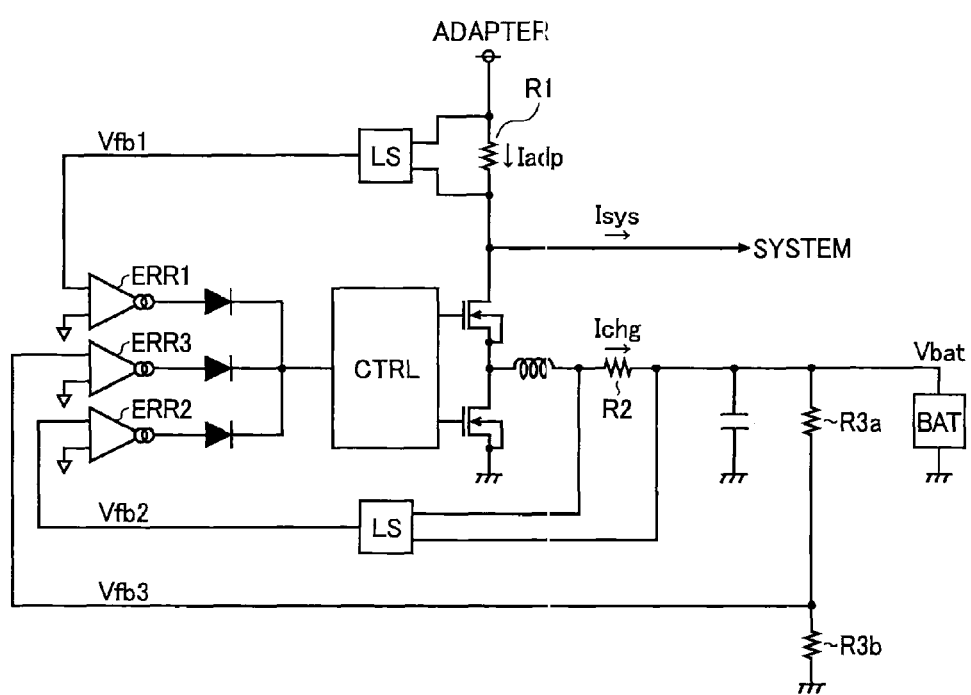
FIG. 6 illustrates a charge control device in accordance with the related art.

The techniques described above are not limited to applications for a charge control device. The technique can be used for a load driving device that has a constant current control function of the driving current, such as a LED driving device (shown in FIG. 5B) or a motor driving device (shown in FIG. 5C).

Technical characteristics disclosed in the specification is generally described below.

In an aspect, a charge control device includes a charge control circuit to control a charge of a secondary battery by controlling an output stage connected between a power supply and the secondary battery. The charge control circuit includes a first error amplifier to generate a first error voltage in response to a difference between a predetermined first reference voltage and a first feedback voltage, a value of the first feedback voltage is determined in accordance with a primary current supplied from the power supply to the output stage, and a second error amplifier to generate a second error voltage in response to a difference between either one of a predetermined second reference voltage or the first error voltage and a second feedback voltage, a value of the second feedback voltage is determined in accordance with a charge current supplied from the output stage to the secondary battery, and a control signal generator to generate the control signal of the output stage in response to the second error voltage.

In some implementations, the charge control circuit includes a third error amplifier to generate a third error voltage based on a difference between a third feedback voltage and a predetermined third reference voltage, a value of the third feedback voltage is determined in accordance with a charge voltage of the secondary battery. The second error amplifier generates the second error voltage based on a difference between any one of the three voltages of a predetermined second reference voltage and the first error voltage or the third error voltage, and the second feedback voltage.

In some implementations, the charge control circuit includes an operation circuit to generate at least any one of the first reference voltage, the second reference voltage and the third reference voltage, based on an analog voltage supplied from outside.

In some implementations, the analog voltage fluctuates in response to an affection of an external reference voltage, and the operation circuit divides the analog voltage by the external reference voltage and multiplies a predetermined internal reference voltage, to generate at least any one of the first reference voltage, the second reference voltage or the third reference voltage.

According to another aspect, a load driving device includes a load driving circuit to drive and control a load by controlling an output stage connected between a power supply and the load. The load driving circuit includes a first error amplifier to generate a first error voltage in response to a difference between a predetermined first reference voltage and a first feedback voltage, a value of the first feedback voltage is determined in accordance with a primary current supplied from the power supply to the output stage, and a second error amplifier to generate a second error voltage in response to a difference between either one of a predetermined second reference voltage or the first error voltage and a second feedback voltage, a value of the second feedback voltage is determined in accordance with a driving current supplied from the output stage to the load, and a control signal generator to generate a control signal of the output stage in response to the second error voltage.

In some implementations, the load driving circuit includes a third error amplifier to generate a third error voltage based on a difference between a third feedback voltage and a predetermined third reference voltage, a value of the third feedback voltage is determined in accordance with a driving voltage supplied to the load. The second error amplifier generates a second error voltage in response to a difference between any one of the three voltages of a predetermined second reference voltage and the first error voltage and the third error voltage, and the second feedback voltage.

In some implementations, the load driving circuit includes an operation circuit to generate at least any one of the first reference voltage, the second reference voltage or the third reference voltage based on an analog volt age supplied externally.

In some implementations, the analog voltage fluctuates in response to an affection of an external reference voltage, and the operation circuit divides the analog voltage by the external reference voltage and multiplies a predetermined internal reference voltage to generate at least any one of the first reference voltage, the second voltage or the third voltage.

In some implementations, the load is a light emitting diode.

In some implementations, the load is a motor.

The disclosure describes a charge control device and a load driving device that make it possible to perform a constant current control on a charge current and a driving current properly.

The disclosure describes a charge control device and a load driving device that make it possible to perform a constant current control on a charge current and a driving current safely.

A number of implementations of the invention have been described. Nevertheless, various modifications can be made without departing from the spirit and scope of the invention. Accordingly, other implementations are within the scope of the claims.

LIST OF REFERENCE NUMERALS 100 charge control device (charge control IC)
100-2 LED driving device (LED driver IC)
100-3 motor driving device (motor driver IC)
101 first error amplifier
102 second error amplifier
103 third error amplifier
104 PWM comparator
105 upper side driver
106 lower side driver
107, 108 registers
109, 110 level shifters
111 regulator
112 operation circuit
200 micro computer
201 PWM signal generator
202 digital-to-analog convertor (DAC)
300 smoothing circuit
N1, N2 NMOS field effect transistors
L1 coil
R1 to R5 resistors
C1 to C5 capacitors
BAT secondary battery

What is claimed is:

1. A charge control device comprising:
a charge control circuit to control a charge of a secondary battery by controlling an output stage connected between a power supply and the secondary battery;
wherein the charge control circuit comprises:
a first error amplifier to generate a first error voltage in response to a difference between a predetermined first reference voltage and a first feedback voltage, wherein a value of the first feedback voltage is determined in accordance with a primary current supplied from the power supply to the output stage;
a third error amplifier to generate a third error voltage based on a difference between a third feedback voltage and a predetermined third reference voltage, wherein a value of the third feedback voltage is determined in accordance with a charge voltage of the secondary battery;
a second error amplifier to generate a second error voltage in response to a difference between (i) the lowest of a predetermined second reference voltage, the first error voltage and the third error voltage, and (ii) a second feedback voltage, wherein a value of the second feedback voltage is determined in accordance with a charge current supplied from the output stage to the secondary battery; and
a control signal generator to generate the control signal of the output stage in response to the second error voltage.

2. The charge control device according to claim 1, wherein the charge control circuit comprises:
an operation circuit to generate at least any one of the first reference voltage, the second reference voltage and the third reference voltage, based on an analog voltage supplied externally.

3. The charge control device according to claim 2, wherein the analog voltage fluctuates in response to an affection of an external reference voltage, and wherein the operation circuit divides the analog voltage by the external reference voltage and multiplies a predetermined internal reference voltage to generate at least any one of the first reference voltage, the second reference voltage or the third reference voltage.

4. The charge control device according to claim 1, wherein each of the first error amplifier, the second error amplifier and the third error amplifier is a gm amplifier that outputs a current or an operational amplifier that outputs a voltage.

5. The charge control device according to claim 1, wherein the control signal generator comprises:
a PWM comparator to generate a pulse width modulation signal based on a comparison between the second error voltage and a triangle wave voltage of a predetermined frequency; and
a driver to generate a control signal of the output stage based on the pulse width modulation signal.

6. A charge control device according to claim 1, wherein the charge control circuit comprises:
a level shifter to generate the first feedback voltage by multiplying a voltage signal, wherein a value of the voltage signal is determined in response to the primary current.

7. The charge control device according to claim 1, wherein the charge control circuit comprises:
a level shifter to generate the second feedback voltage by multiplying a voltage signal, wherein a value of the voltage signal is determined in response to the charge current.

8. The charge control device according to claim 1, wherein the charge control circuit comprises:

a regulator to generate a predetermined internal power supply voltage by stepping down an external power supply voltage supplied from the power supply.

9. A load driving device comprising:

a load driving circuit to drive and control a load by controlling an output stage connected between a power supply and the load;

wherein the load driving circuit comprises:

a first error amplifier to generate a first error voltage in response to a difference between a predetermined first reference voltage and a first feedback voltage, wherein a value of the first feedback voltage is determined in accordance with a primary current supplied from the power supply to the output stage;

a third error amplifier to generate a third error voltage based on a difference between a third feedback voltage and a predetermined third reference voltage, wherein a value of the third feedback voltage is determined in accordance with a driving voltage supplied to the load;

a second error amplifier to generate a second error voltage in response to a difference between (i) the lowest of a predetermined second reference voltage, the first error voltage and the third error voltage, and (ii) a second feedback voltage, wherein a value of the second feedback voltage is determined in accordance with a driving current supplied from the output stage to the load; and a control signal generator to generate a control signal of the output stage in response to the second error voltage.

10. The load driving device according to claim 9, wherein the load driving circuit comprises:

an operation circuit to generate at least any one of the first reference voltage, the second reference voltage or the third reference voltage based on an analog voltage supplied externally.

11. The load driving device according to claim 10, wherein the analog voltage fluctuates in response to an affection of an external reference voltage, and wherein the operation circuit divides the analog voltage by the external reference voltage and multiplies a predetermined internal reference voltage to generate at least any one of the first reference voltage, the second reference voltage or the third reference voltage.

12. The load driving device according to claim 9, wherein each of the first error amplifier, the second error amplifier and the third error amplifier is a gm amplifier that outputs a current or an operational amplifier that outputs a voltage.

13. The load driving device according to claim 9, wherein the control signal generator comprises:

a PWM comparator to generate a pulse width modulation signal based on a comparison between the second error voltage and a triangle wave voltage of a predetermined frequency; and a driver to generate a control signal of the output stage in response to the pulse width modulation signal.

14. The load driving device according to claim 9, wherein the load driving circuit comprises:

a level shifter to generate the first feedback voltage by multiplying a voltage signal, wherein a value of the voltage signal is determined in response to the primary current.

15. The load driving device according to claim 9, wherein the load driving circuit comprises:

a level shifter to generate the second feedback voltage by multiplying a voltage signal, wherein a value of the voltage signal is determined in response to the driving current.

16. The load driving device according to claim 9, wherein the load driving circuit comprises:

a regulator to generate a predetermined internal power supply voltage by stepping down an external power supply voltage supplied from the power supply.

17. The load driving device according to claim 9, wherein the load is a light emitting diode.

18. The load driving device according to claim 9, wherein the load is a motor.

* * * * *